(12) United States Patent
Schultz

(10) Patent No.: US 9,103,303 B2
(45) Date of Patent: *Aug. 11, 2015

(54) AIR FILTER ASSEMBLY FOR AN ENGINE

(71) Applicant: Briggs & Stratton Corporation, Wauwatosa, WI (US)

(72) Inventor: Michael Schultz, Menomonee Falls, WI (US)

(73) Assignee: BRIGGS & STRATTON CORPORATION, Wauwatosa, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/273,345

(22) Filed: May 8, 2014

(65) Prior Publication Data

US 2014/0237960 A1    Aug. 28, 2014

Related U.S. Application Data

(63) Continuation of application No. 13/026,171, filed on Feb. 11, 2011, now Pat. No. 8,752,533.

(51) Int. Cl.
*F02B 25/06* (2006.01)
*F02M 35/024* (2006.01)
(Continued)

(52) U.S. Cl.
CPC .......... *F02M 35/02433* (2013.01); *F02M 25/06* (2013.01); *F02M 35/0204* (2013.01);
(Continued)

(58) Field of Classification Search
CPC .................. F02M 35/02433; F02M 35/0204; F02M 35/0207; F02M 35/02483; F02M 35/048; F02M 35/1017; F02M 25/06; Y02T 10/121

USPC .......... 123/198 E, 572–573; 55/385.3, 385.7, 55/413, 495
See application file for complete search history.

(56) References Cited

U.S. PATENT DOCUMENTS 3,158,142 A * 11/1964 Bradshaw ...................... 123/572
3,167,060 A    1/1965 Fowler et al.
(Continued)

FOREIGN PATENT DOCUMENTS

EP    1 201 883    5/2002
RU    2165287    4/2001
(Continued)

OTHER PUBLICATIONS

Extended European Search Report for European Patent Application No. 12744585.6, dated May 30, 2014, 6 pages.
(Continued)

*Primary Examiner* — Hung Q Nguyen
(74) *Attorney, Agent, or Firm* — Foley & Lardner LLP

(57) ABSTRACT

A filter element is provided for an air filter assembly of an internal combustion engine including a breather conduit and an intake conduit. The filter element includes a first wall, a second wall, filter media extending between the first and second walls, a first aperture in one of the first and second walls configured to receive air from the breather conduit, and a second aperture in one of the first and second walls configured to deliver air to the intake conduit. The filter media, the first wall, and the second wall define an interior chamber of the filter element. The first and second apertures connect to the interior chamber such that air filtered by the filter media mixes with unfiltered gases provided through the first aperture by the breather conduit prior to exiting the interior chamber through the second aperture into the intake conduit.

23 Claims, 8 Drawing Sheets

(51) Int. Cl.
*F02M 25/06* (2006.01)
*F02M 35/02* (2006.01)
*F02M 35/04* (2006.01)
*F02M 35/10* (2006.01)

(52) U.S. Cl.
CPC ..... *F02M35/0207* (2013.01); *F02M 35/02483* (2013.01); *F02M 35/048* (2013.01); *F02M 35/1017* (2013.01); *Y02T 10/121* (2013.01)

(56) References Cited

U.S. PATENT DOCUMENTS

| | | |
|---|---|---|
| 3,277,876 A | 10/1966 | Abts |
| 3,589,108 A | 6/1971 | Dingel et al. |
| 4,233,043 A | 11/1980 | Catterson |
| 4,251,238 A * | 2/1981 | Claes et al. .............. 95/278 |
| 4,396,407 A * | 8/1983 | Reese .............. 55/319 |
| 4,861,359 A | 8/1989 | Tettman |
| 4,871,381 A * | 10/1989 | Smith .............. 55/385.3 |
| 5,233,967 A | 8/1993 | Peller |
| 5,368,621 A | 11/1994 | Pool |
| 5,499,616 A | 3/1996 | Enright |
| 5,688,299 A | 11/1997 | Goodwin |
| 5,937,816 A | 8/1999 | Wincewicz et al. |
| 6,235,073 B1 | 5/2001 | Bannister et al. |
| 6,261,333 B1 | 7/2001 | Dickson |
| 6,374,815 B1 | 4/2002 | Ness et al. |
| 6,780,217 B1 | 8/2004 | Palmer |
| 6,868,843 B2 | 3/2005 | Yasui |
| 6,955,697 B1 | 10/2005 | Hsu et al. |
| 6,978,773 B2 | 12/2005 | Hunter |
| 7,217,361 B2 | 5/2007 | Connor et al. |
| 7,282,077 B2 | 10/2007 | Honisch et al. |
| 2004/0144375 A1 | 7/2004 | Hunter |
| 2005/0023210 A1 | 2/2005 | Connor et al. |
| 2010/0199958 A1 | 8/2010 | Heckel et al. |

FOREIGN PATENT DOCUMENTS

| | | |
|---|---|---|
| RU | 2301909 | 6/2007 |
| WO | WO-2005/042961 | 5/2005 |

OTHER PUBLICATIONS

Art Filter Cartridge sold by Briggs & Stratton prior to Feb. 11, 2010, 2 pages.
International search report and Written Opinion regarding International Application No. PCT/US2012/024343, mail date Jun. 21, 2012, 7 pages.
Product Styles, 2010 FRAM Product Reference Catalog, 33 pages.

* cited by examiner

AIR FILTER ASSEMBLY FOR AN ENGINE

CROSS-REFERENCE TO RELATED PATENT APPLICATIONS

This is a continuation of U.S. application Ser. No. 13/026,171, filed Feb. 11, 2011, which is incorporated herein by reference in its entirety.

BACKGROUND

The present application generally relates to the field of air filters and air filter assemblies, such as those for use with internal combustion engines.

An internal combustion engine typically includes an air filter for removing dust, dirt, or other debris from air entering the engine for combustion processes. The air filter assembly may be housed in a case and include a filter element, which includes filter media, such as filter paper, foam, mesh, oil bath, or other media. After passing through the filter media, the filtered air is typically routed to a carburetor to pick up fuel and then to a combustion chamber of the engine. Removing the debris from the air helps to preserve the moving components of the engine, such as the piston and crankshaft, avoiding excess friction and wear, as well as preventing clogging of the fuel delivery system.

SUMMARY

One embodiment of the invention relates to an engine, which includes a breather conduit, an intake conduit, and an air filter assembly. The air filter assembly includes a case and a filter element. The case includes a first opening for receiving the breather conduit, and a second opening for receiving the intake conduit. The filter element includes a first aperture, a second aperture, and filter media at least partially defining an interior chamber of the filter element. The first and second apertures of the filter element are at least partially aligned with the first and second openings of the case, respectively. The filter element is positioned in the case such that the breather conduit and the intake conduit are directed to or from the interior chamber of the filter element, such that air filtered by the filter media mixes with unfiltered gases from the breather conduit in the interior chamber of the filter element prior to entering the intake conduit.

Another embodiment of the invention relates to an air filter assembly for an internal combustion engine. The air filter assembly includes a base and a cover configured to be fastened to the base. The base and cover define an interior volume of the air filter assembly sized to receive an air filter element. The air filter assembly further includes a first opening through at least one of the base and the cover, and a second opening through at least one of the base and the cover. The first opening is configured to receive air from a crankcase breather conduit, and the second opening is configured to deliver air to an air intake conduit. The first and second openings are symmetrically arranged relative to the interior volume.

Yet another embodiment of the invention relates to a filter element for an air filter assembly of an internal combustion engine. The filter element includes a top wall, a bottom wall, and filter media extending between the top and bottom walls. The filter element further includes a first aperture configured to receive air from a breather conduit and a second aperture configured to deliver air to an intake conduit. The first and second apertures are equally spaced apart from the center of the filter element.

Still another embodiment of the invention relates to an engine, which includes a breather conduit, an intake conduit, and an air filter assembly. The air filter assembly includes a filter element and a case. The filter element includes a top wall, a bottom wall, a first aperture through the bottom wall, a second aperture through the bottom wall, and filter media extending between the top and bottom walls and at least partially defining an interior chamber of the filter element. The first and second apertures are the same shape, the same size, and are equally spaced apart from the center of the bottom wall. The case includes a base, a first opening for receiving the breather conduit formed in the base, a second opening for receiving the intake conduit formed in the base, and a cover configured to be fastened to the base. The base and the cover define an interior volume of the air filter assembly sized to receive the filter element with the first aperture and the second aperture of the filter element being at least partially aligned with the first opening and the second opening of the case, respectively. The filter element is configured to be received in the case such that the breather conduit and the intake conduit are directed to and from the interior chamber of the filter element, respectively, whereby air filtered by the filter media mixes with unfiltered gases from the breather conduit in the interior chamber of the filter element prior to entering the air intake conduit.

Another embodiment of the invention relates to a filter element for an air filter assembly of an engine. The filter element includes filter media, a first wall, and a second wall. The filter media has a closed loop, a top, and bottom. The first wall is provided on the top of the filter media, and has no openings. The second wall is provided on the bottom of the filter media, and has two separate openings.

Another embodiment of the invention relates to a method of manufacturing a filter element for an air filter of an engine. The method includes pouring a first amount of foam material into a first mold, inserting a first portion of filter media into the first amount of foam material, and solidifying the first amount foam material to form a first wall of the filter element such that the first portion of the filter media is integrated with the first wall. The method further includes pouring a second amount of foam material into a second mold, inserting a second portion of the filter media into the second amount of foam material, and solidifying the second amount of foam material to form a second wall of the filter element such that the second portion of the filter media is integrated with the second wall. One of the first and second walls includes two separate openings.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
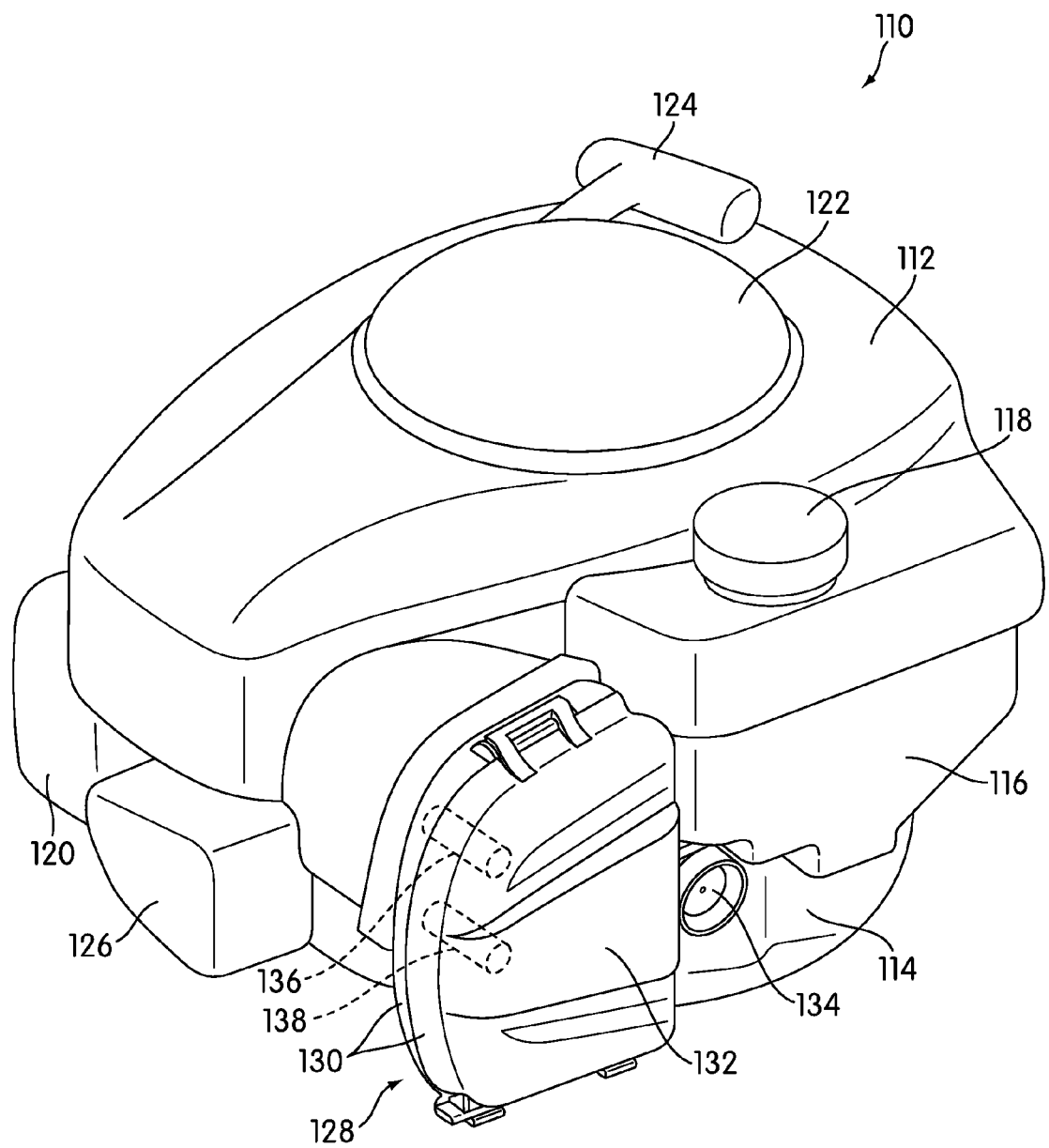
FIG. 1 is a perspective view of an internal combustion engine according to an exemplary embodiment of the invention.

Referring to FIG. 1, an engine is shown as an internal combustion engine 110, which includes an engine cover 112, a crankcase 114, a fuel tank 116 and cap 118, and a muffler 120. In some embodiments, the engine 110 includes an automatic rewind 122 for a recoil starter system, and a handle 124 for an associated pull cord. In some embodiments, the engine 110 further includes a rocker cover 126. According to an exemplary embodiment, the engine 110 includes an air filter assembly 128, which includes a case 130 with a cover 132. A primer bulb assembly 134 may be integrated with the case 130 of the air filter assembly 128. In other embodiments, the primary bulb or primary bulb assembly is not included.

According to an exemplary embodiment, the air filter assembly 128 is coupled to a breather conduit 136 and an intake conduit 138 of the engine 110. The breather conduit 136 may include a rubber hose, metal pipe, or another form of conduit that is coupled to the crankcase 114 of the engine 110, and is configured to relieve fluctuating pressures within the crankcase 114 due to movement of the piston, changes in temperature expanding or contracting gases in the crankcase 114, or other reasons. The intake conduit 138 is configured to provide filtered air from the air filter assembly 128 to the combustion chamber of the engine 110. In some embodiments, the intake conduit 138 is coupled to a carburetor (not shown), such as by way of an intake manifold, an intake passage, or directly to the throat of the carburetor. In other embodiments, the intake conduit 138 is coupled to a fuel injector or another system of the engine 110. The intake conduit 138 may be separate or may be at least partially integrated with the engine block or cylinder head (not shown), and may be formed from metal, plastic, or other materials.

In some embodiments, the engine 110 is a vertically-shafted engine, as shown in FIG. 1 in a generally upright position. In other contemplated embodiments, the engine may be horizontally-shafted, where the shaft would extend from a side of the engine, such as in a location generally proximate to the locations of the primer bulb 134 or rocker cover 126 shown in FIG. 1. Although shown in FIG. 1 as an overhead-valve engine with the rocker cover 126, in other embodiments the engine 110 may be an L-head engine or another configuration of engine. In contemplated embodiments, the engine 110 may have one, two, or more cylinders. The engine 110 may run on a four-stroke cycle or a two-stroke cycle. In contemplated embodiments, the engine 110 may be gasoline-powered, diesel, or otherwise fueled. In some contemplated embodiments, the engine 110 may be configured to drive a lawn mower, a portable electric generator, pressure washer, snow thrower, chipper/shredder, log splitter, tractor, riding mower, or other outdoor power equipment. In other contemplated embodiments, the air filter assembly 128 may be used to filter air that is not provided to an internal combustion engine, such as filtered air for a pneumatic pump or actuator, a cooling system, or another system.

Referring to FIGS. 2-5, the cover 132 (FIGS. 2-3) of the air filter assembly 128 is designed to fasten and unfasten to a base 140 (FIGS. 4-5) of the air filter assembly 128, to form the case 130 (FIG. 1). The exterior 142 (FIG. 2) of the cover 132 provides an outside surface of the engine 110, and the exterior 144 (FIG. 5) of the base 140 is configured to be coupled to the engine 110, such as fastened via bolt holes 196 (FIGS. 4-5) or other fasteners. The interior 146 (FIG. 3) of the cover 132 and the interior 148 (FIG. 4) of the base 140 at least partially form an interior volume of the air filter assembly 128. In some embodiments, the cover 132 and base 140 are molded from a plastic material. In other embodiments, at least one of the cover 132 and base 140 is stamped or assembled from aluminum, another material, or is formed from a combination of materials and manufacturing processes.

Figure 2:
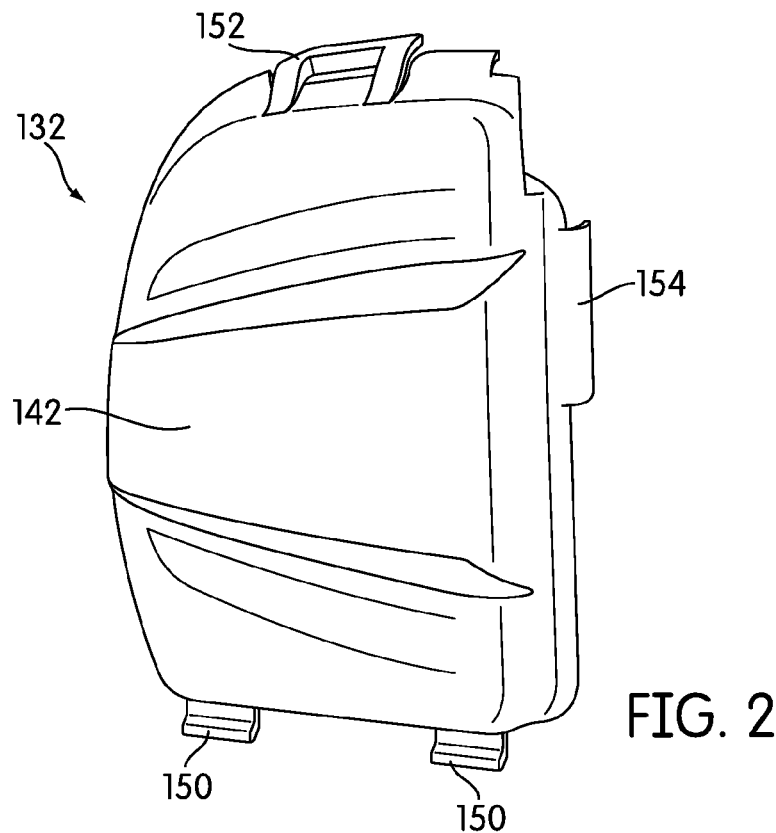
FIG. 2 is a perspective view of a cover of an air filter assembly according to an exemplary embodiment of the invention, in a first orientation.
Figure 3:
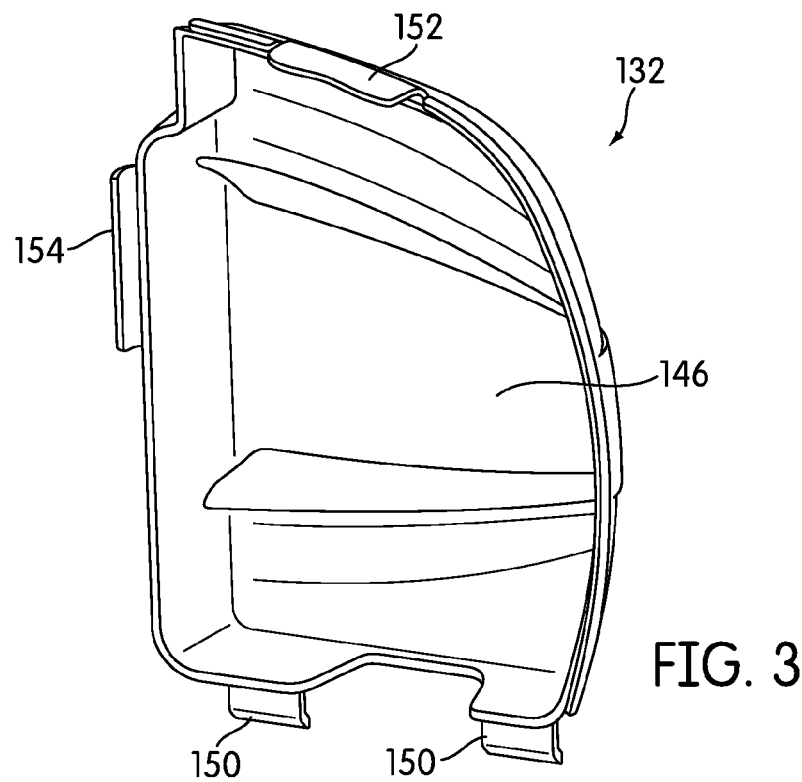
FIG. 3 is a perspective view of the cover of FIG. 2 in a second orientation.

According to an exemplary embodiment, the cover 132 further includes hinge wings 150, an integral hook 152, and a guide structure 154 (e.g., flange) (FIGS. 2-3). The hinge wings 150 are designed to couple with pins 156 (FIGS. 4-5) integrally formed with the base 140. The cover 132 is then configured to rotate about the pins 156. In some embodiments, hinge wings are integrally formed with the base 140 and the pins are integrally formed with the cover 132. In other embodiments, the cover 132 is fastened to the base 140 with other forms of integral or separate fasteners (e.g., nuts and bolts).

According to an exemplary embodiment, the hook 152 is configured to snap or otherwise fasten to a corresponding catch 158 on the base 140 (FIGS. 4-5) for securing the case 130 in a closed configuration. Guides 194 facilitate placement of the hook 152 and help to prevent lateral slipping of the hook 152 from the catch 158. To release the hook 152, the top of the hook 152 may be lifted off the catch 158. The cover 132 may then be rotated about the pins 156 to an open configuration. In other contemplated embodiments, other forms of releasable locking mechanisms are used, such as sliding latches, screws, etc. Opening the cover 132 allows for insertion, removal, and checking of the status of a filter element (see, e.g., filter element 160 as shown in FIGS. 6-10) positioned within the interior volume 146, 148 of the case 130.

Referring now to FIGS. 6-9, a filter element 160 includes a top wall 162, a bottom wall 164, and filter media 166 extending between the top and bottom walls 162, 164. According to an exemplary embodiment the filter media 166 at least partially defines an interior chamber 168 of the filter element 160, with the top and bottom walls 162, 164 also at least partially defining the interior chamber 168. In some such embodiments, the filter media 166 is structured such that the filter media 166 has a closed-loop, such as the periphery of a circle, ellipse, rectangle, or other closed-loop shape. In some contemplated embodiments, the filter media 166 may fill some or all of the space between the top and bottom walls 162, 164. In other contemplated embodiments, a filter element includes a bottom wall and filter media, without a top wall other than the top of the filter media. In some embodiments, the filter element 160 has a periphery formed from straight segments extending between rounded ends.

According to an exemplary embodiment, the top and bottom walls 162, 164 are formed from a rigid material, such as plastic, cardboard, wood, composite, aluminum, or other materials. In some embodiments, the filter media 166 includes pleated filter paper, while in other embodiment other forms of filter media are used. In some embodiments, the filter element 160 is generally oblong in shape, with straight sides and rounded ends. However, in contemplated embodiments, the filter element may be rectangular, elliptical, asymmetrically-shaped, or otherwise shaped.

Figure 7:
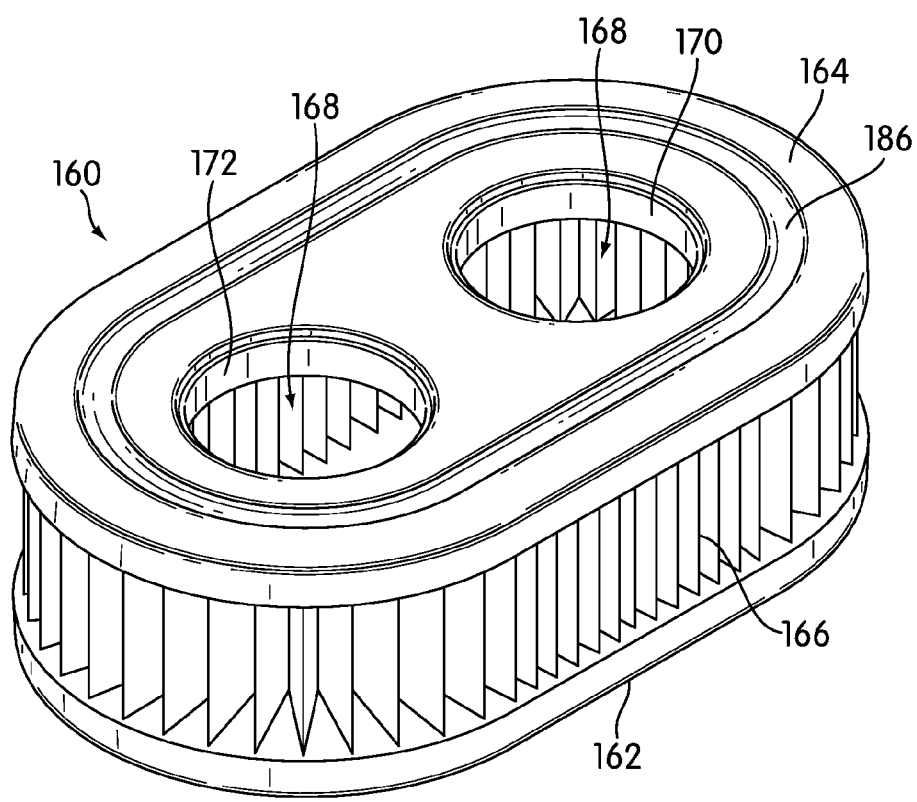
FIG. 7 is a perspective view of the filter element of FIG. 6 in a second orientation.
Figure 8:
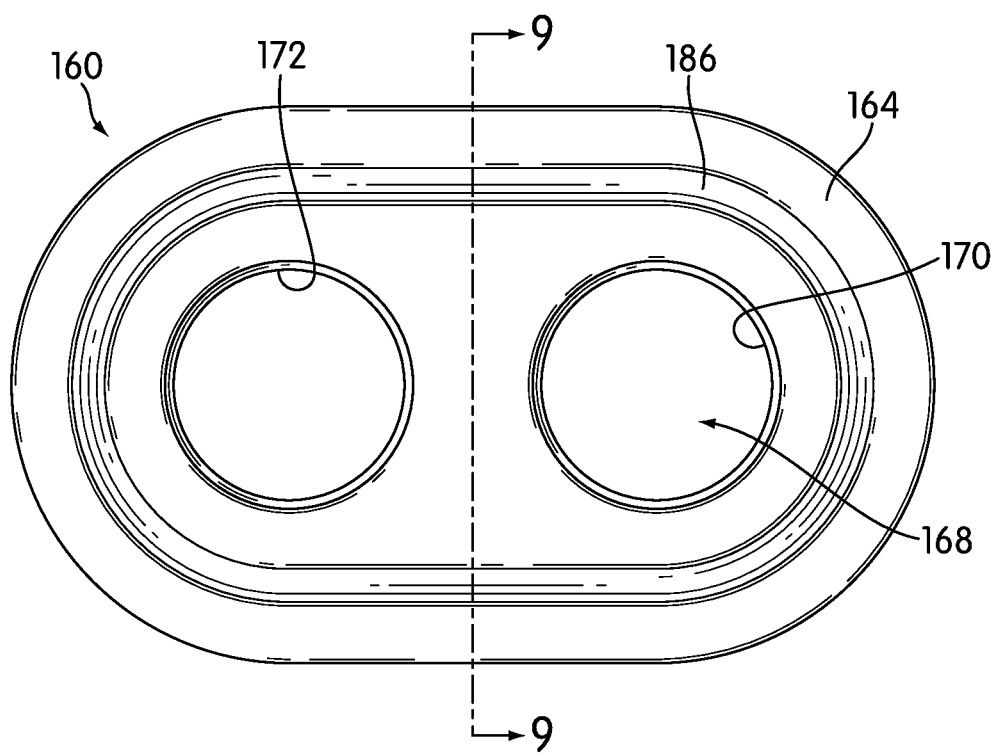
FIG. 8 is a bottom view of the filter element of FIG. 6.
Figure 9:
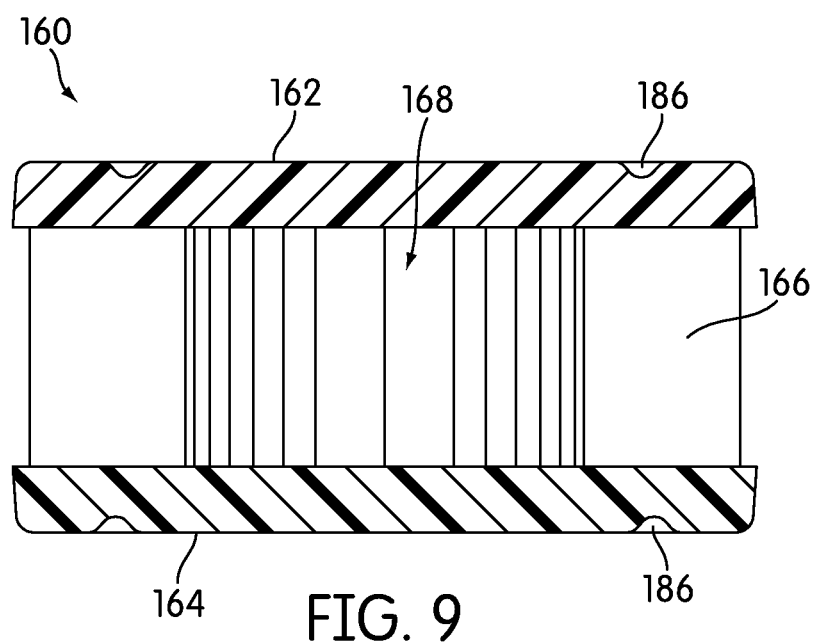
FIG. 9 is a sectional view of the filter element of FIG. 6, taken along line 9-9 of FIG. 8.
Figure 11:
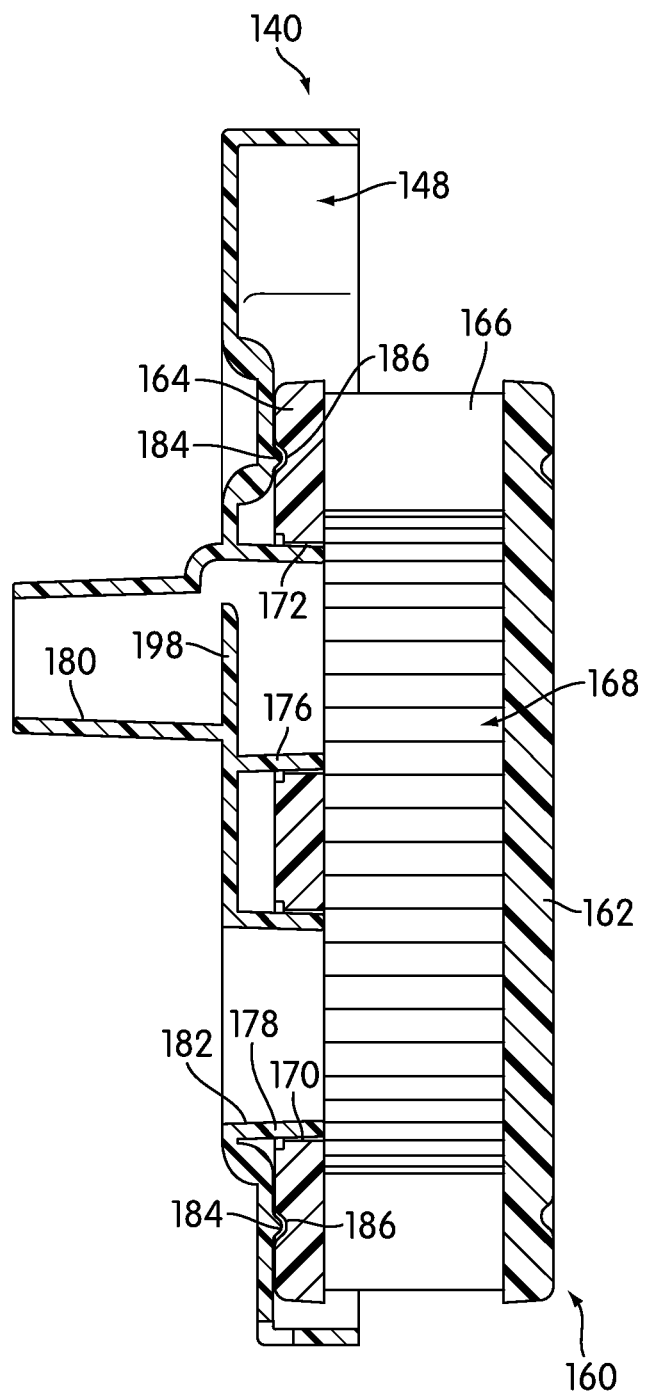
FIG. 11 is a sectional view of the base of FIG. 10, taken along line 11-11 of FIG. 10.

Referring to FIGS. 7-8, the filter element 160 includes a first aperture 170 (e.g., opening, hole) configured to receive air from the breather conduit 136 (FIG. 1), and a second aperture 172 configured to provide air to the intake conduit 138 (FIG. 1). According to some exemplary embodiments, the apertures 170, 172 are substantially the same size and shape, allowing for minor variations in some such embodiments. In other contemplated embodiments, one aperture may be substantially larger or smaller than the other aperture, such as by a factor of two, five, or ten times. In some embodiments the apertures 170, 172 are circular, while in other contemplated embodiments, the apertures may be hexagonal, oblong, or otherwise shaped. While portions of the apertures 170, 172 are substantially the same size, in some embodiments, the cross-sections of the apertures 170, 172 may differ from one another in other portions of the apertures 170, 172, along the paths of the apertures 170, 172 through the bottom wall 164 of the filter element 160. Similarly, while the openings 180, 182 may include nearly identical portions, the opening 180 shown in FIGS. 4 and 11 includes a step 198 (e.g., shoulder) changing the cross-sectional width of a portion of the opening 180.

During use, the portion of the filter media 166 that is closer to the second aperture 172, which may be associated with (e.g., directly coupled to, connected to) the intake conduit 138, may collect more debris than the portion of the filter media 166 that is closer to the first aperture 170, which may be associated with the breather conduit 136. According to an exemplary embodiment, the apertures 170, 172 are arranged on the filter element 160 in a manner configured to allow for reversal of the filter element 160 so that the first aperture 170 is instead associated with the intake conduit 138, and the second aperture 172 is associated with the breather conduit 136 in the air filter assembly 128. Accordingly, in some such embodiments, the sizing and spacing of the first and second apertures 172, 170 allows the filter element 160 to be rotated, with the cleaner portion of the filter media 166 moved closer to the intake conduit 138, which is intended to allow for a longer life of the filter element 160 by more evenly using the filter media 166. However, in other embodiments, the filter is not reversible.

According to an exemplary embodiment, use of two, evenly-sized and commonly-shaped apertures 170, 172 defined in the structure of the filter element 160 facilitates reversing of the filter element 160. In some embodiments, the apertures 170, 172 are symmetrically arranged on the same wall 162, 164 of the filter element 160, where rotating the filter element 160 by 180-degrees switches the apertures 172, 170 (see FIGS. 7-8). The section line 9-9 of FIG. 8 also defines a line of symmetry with respect to the apertures 170, 172. A line orthogonal to the section line 9-9, along the exterior of the bottom wall 164 and passing through the center of the base 140 symmetrically divides each aperture individually in some embodiments. In other embodiments, apertures 170, 172 may be positioned on different walls 162, 164, either aligned or oppositely positioned on the different walls 162, 164 such that flipping the filter element 160 switches the apertures 170, 172. In still other contemplated embodiments, the filter element may not be reversible.

According to an exemplary embodiment, the aperture of the filter element 160 that is associated with the intake conduit 138 is not centered within the filter element 160. Instead each aperture 172, 170 is eccentrically positioned, and the interior chamber 168 within the filter media 166 is elongated, allowing for a large volume for fresh air that has been filtered and air from the breather conduit 136 to mix before entering the intake conduit 138. Mixing of fresh air and breather air may reduce hydrocarbon emissions by better facilitating the burning of hydrocarbons carried in the breather air. Additionally, increasing the surface area of the filter media 166 surrounding the interior chamber 168, such as may be accomplished with an elongated shape of the filter element 160, is intended to widen the flow path of air through the filter media 166, increasing the life of the filter element 160 and decreasing drag upon the intake of air into the engine 110.

Referring again to FIGS. 3-4, the base 140 of the air filter assembly 128 includes an area 174 for receiving the filter element 160, or another compatible filter element. Within the area 174 for receiving the filter element 160, the base 140 includes a first boss 176 (e.g., extension, protrusion, guide) and a second boss 178. According to an exemplary embodiment, the bosses 176, 178 are sized and positioned to receive the first and second apertures 170, 172 of the filter element 160. In some embodiments, the apertures 170, 172 each include a beveled opening designed to facilitate receipt of the bosses 176, 178. In some embodiments, the bosses 176, 178 each include a tapered end designed to facilitate insertion into the apertures 170, 172. For example, the apertures 170, 172 in FIG. 7 are shown to include rounded outer edges, and the bosses 176, 178 in FIG. 4 are shown to narrow toward the top edge.

According to an exemplary embodiment, a first opening 180 is defined in the first boss 176, and a second opening 182 is defined in the second boss 178. In some embodiments, the first opening 180 and the second opening 182 are substantially the same size and shape as one another, and are formed by the interior of the bosses 176, 178. Further, the openings 180, 182 are substantially equally spaced apart from the center of the area 174 for receiving the filter element 160 in the base 140. The spacing and location are intended to improve mixing of the fresh air and breather air prior to combustion, to reduce hydrocarbon emissions. In other contemplated embodiments one or more of the bosses 176, 178, and one or more of the openings 180, 182 may be formed in a cover of a case of an air filter assembly. In other contemplated embodiments, more than two bosses and openings are formed in a case and more than two apertures are formed in the respective filter element, such as with embodiments where two or more breather conduits are used.

Figure 4:
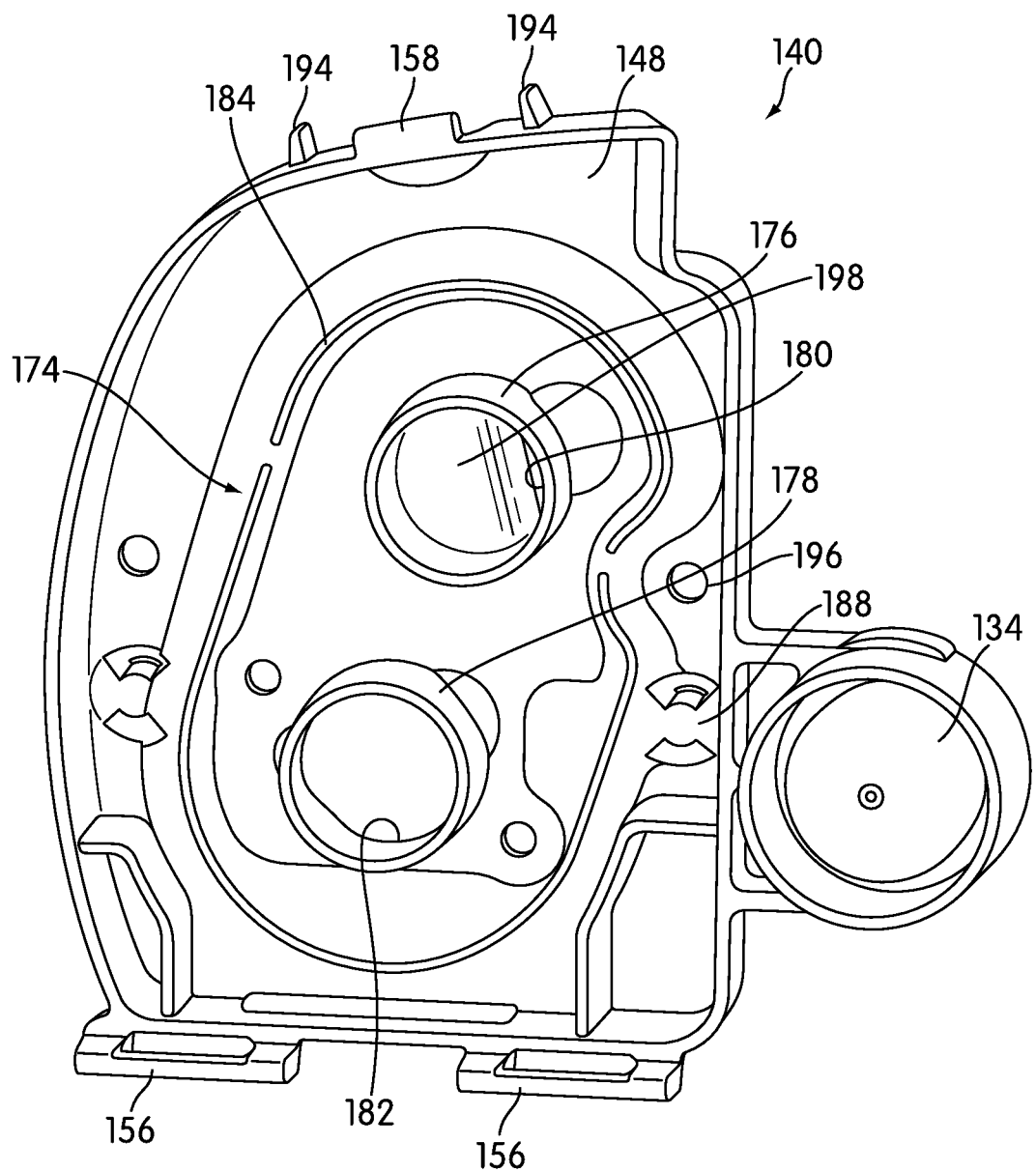
FIG. 4 is a perspective view of a base of an air filter assembly according to an exemplary embodiment of the invention, in a first orientation.
Figure 5:
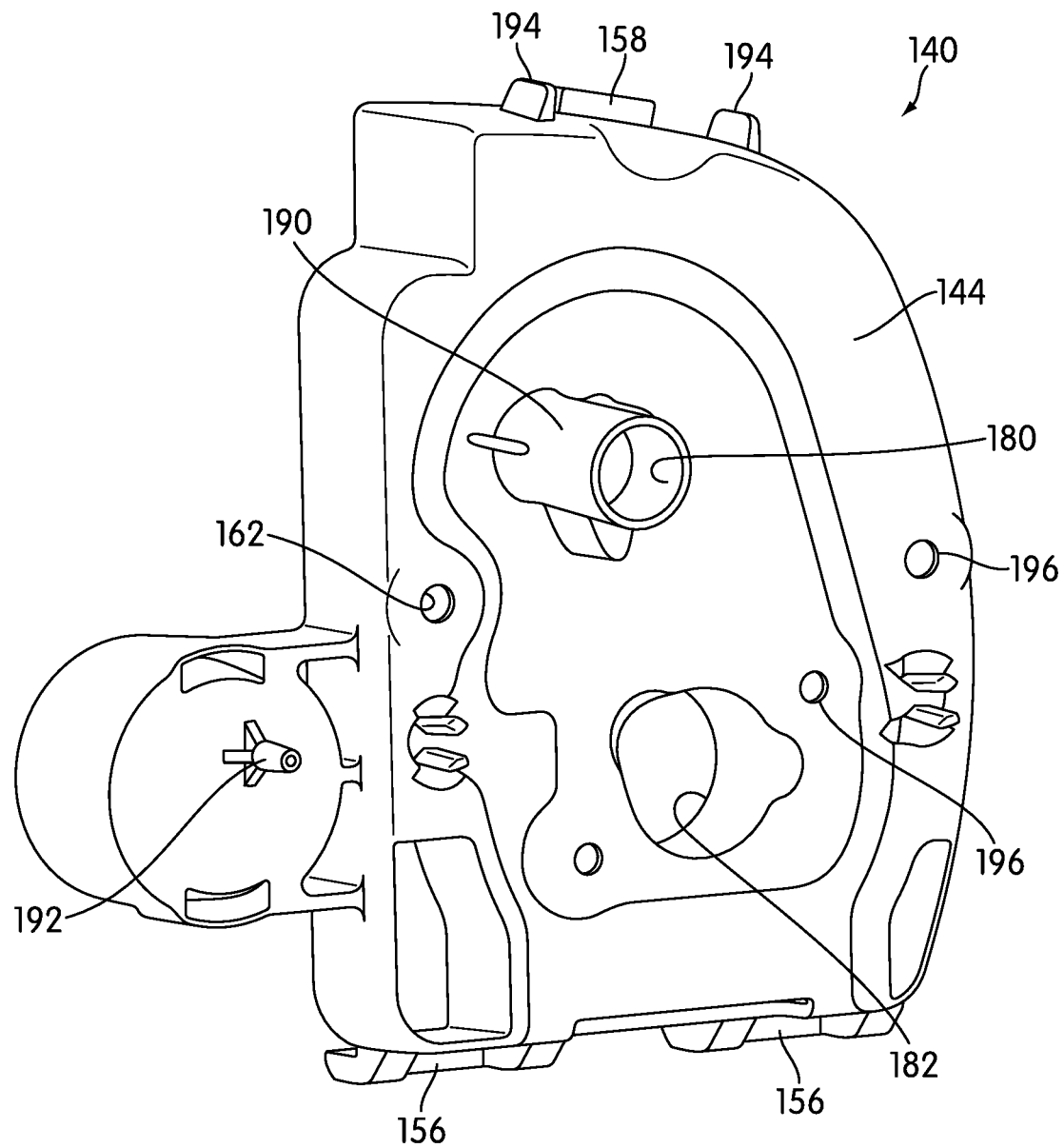
FIG. 5 is a perspective view of the base of FIG. 4 in a second orientation.
Figure 6:
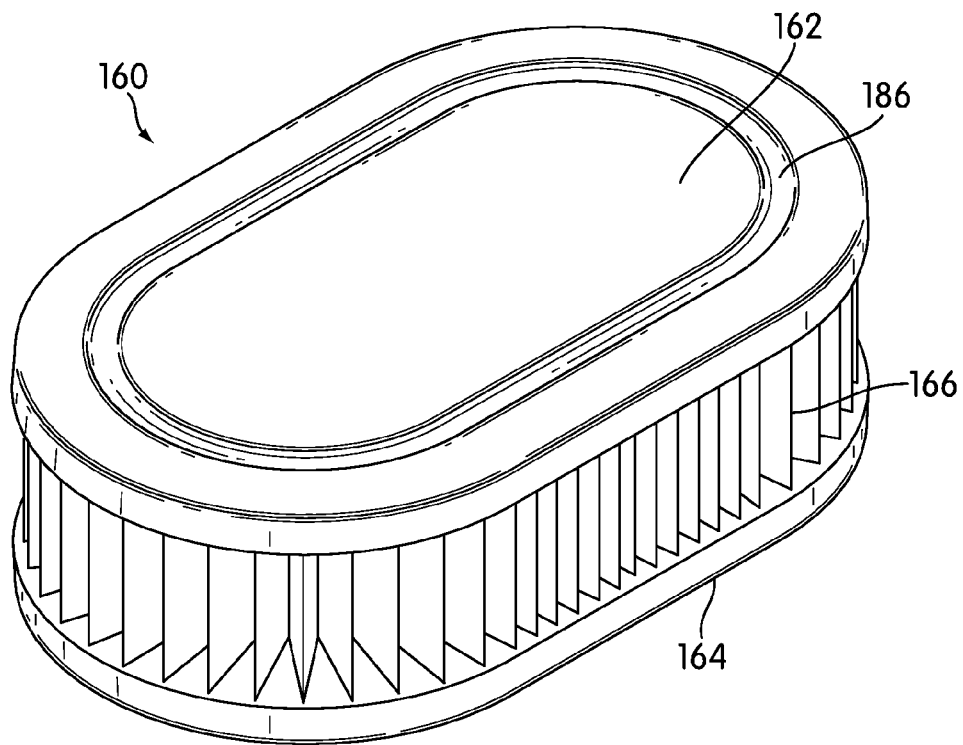
FIG. 6 is a perspective view of a filter element for an air filter assembly according to an exemplary embodiment of the invention, in a first orientation.
Figure 10:
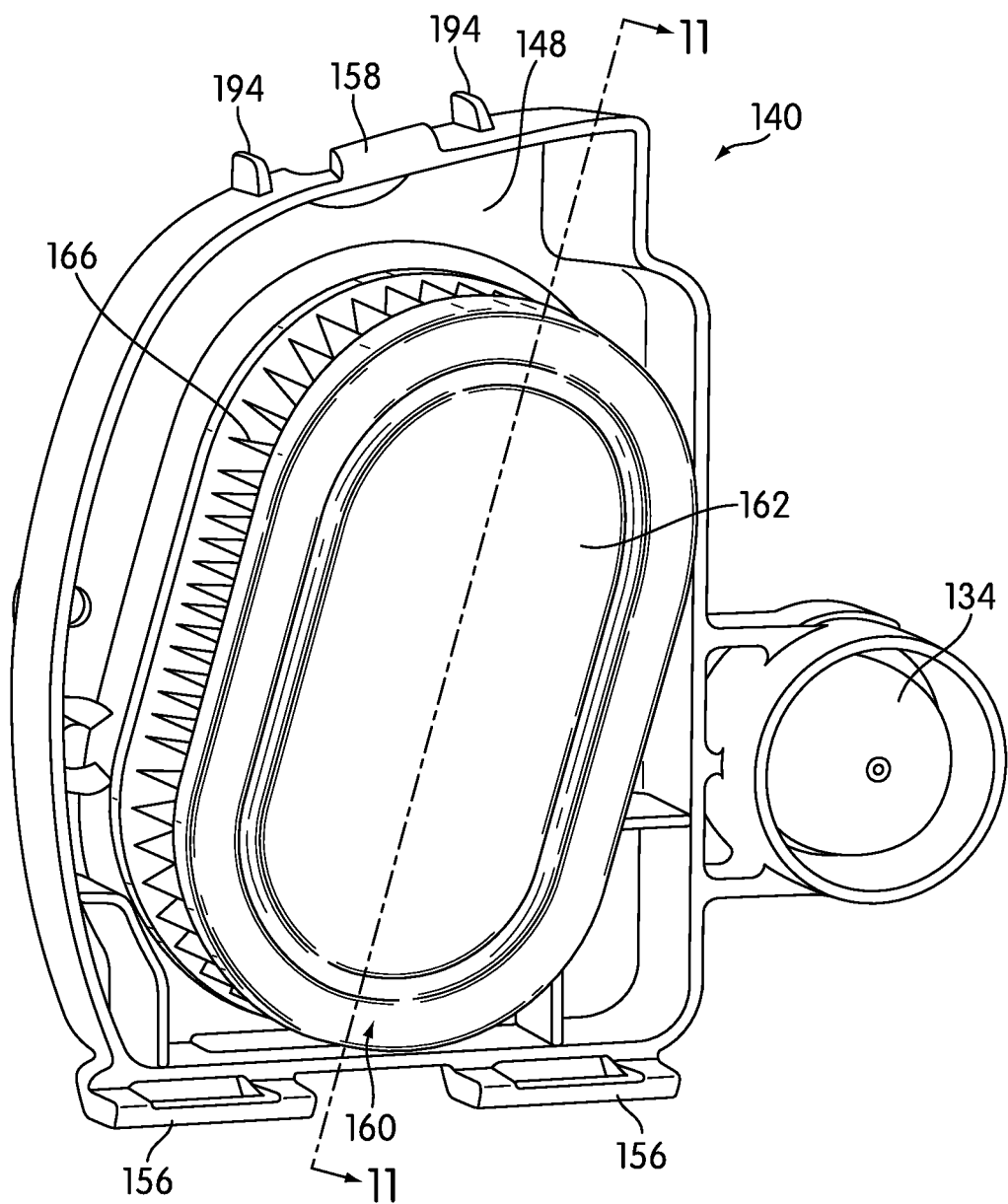
FIG. 10 is a perspective view of the base of FIG. 4 and the filter element of FIG. 6.

Referring now to FIGS. 4, 7, and 10, when the filter element 160 is inserted into the area 174 of the base 140 for receiving the filter element 160, the bosses 176, 178 are inserted into the apertures 170, 172, and a protrusion 184 (e.g., seal) of the base 140 is received in a groove 186 on the filter element 160. Clips 188 formed in the base 140 engage the bottom wall 164 of the filter element 160, and may serve to facilitate attachment the air cleaner base 140 to the engine. In some contemplated embodiments, the clips 188 may include a hook, flange, or other form of connector attached to a flexible portion of material, where the hook is biased to catch a corresponding portion of the filter element 160, such as the bottom wall 162. The clips 188 may lock onto the bottom wall 162 as the filter element 160 is placed in the area 174. The clips 188 may also release when pulled backward, away from the filter element 160, to allow for removal of the filter element 160. In other contemplated embodiments, the clips 188 may operate by inserting through corresponding holes in a filter element, by rotating over a portion of the filter element to latch onto the filter element, or may otherwise operate to hold the filter element in place. In still other embodiments, no clips are included. On the exterior 144 of the base 140, the first opening 180 narrows to a connector 190 configured to receive the breather conduit 136, and the second opening is sized and configured to couple with the intake conduit 138. A hose tail connector 192 extends from a conduit behind the primer bulb 134.

According to an exemplary embodiment, the walls 162, 164 on the top and bottom of the filter element 160 are designed to easily slide over the bosses 176, 178, facilitating quick insertion and removal of the filter element 160 from the air filter case 130 because the apertures 170, 172 are fixedly positioned to fit over the associated openings 180, 182 in the case 130. In some such embodiments, there is no flexing or bending of the filter media 166 during insertion, or accidental catching or tearing of filter media 166 upon removal due to the design of the walls 162, 164 and receiving area 174. Furthermore, the interface between solid surfaces of the bosses 176, 178 and solid surfaces of the apertures 170, 172 in the bottom wall 162 may allow for a tighter seal between the filter element 160 and the breather and intake conduits 136, 138. According to such an embodiment, there is a greatly reduced likelihood of an air leak around the filter media 166, such as may otherwise occur if a filter media had been improperly installed in the corresponding air filter.

During operation, as the engine 110 is running, fresh air (e.g., outside air) is drawn into the interior volume 146, 148 of the air filter assembly 128 through openings in the cover 132. Debris is filtered out of the fresh air as the fresh air passes through the filter media 166. Concurrently, pressure fluctuations in the crankcase of the engine 110 draw or provide air through the first aperture 170 by way of the breather conduit 136, which may contain oil from the crankcase. The breather air and the fresh air are provided in the interior chamber 168 of the filter element 160. The air is then drawn through the second aperture 172 and to the interior of the engine 110 by way of the intake conduit 138 for combustion within the engine 110. In some embodiments, the aperture 170 associated with the breather conduit 136 is positioned vertically above the aperture 172 associated with the intake conduit 138 so that gravity pulls any liquids transferred from the breather conduit 136 down into the intake conduit 138 for combustion.

In some embodiments, the walls 162, 164 of the filter element 160 are formed from a foam material, such as flexible urethane foam. In some such embodiments, a first amount of the foam material in a fluid form is poured into a mold configured to form one of the walls 162, 164. A top or bottom edge of pleated paper 166 (or other filter media) is inserted into the foam material prior to solidification of the foam material in the mold. As the foam material solidifies, the edge of the pleated paper is then integrated with (e.g., fixed to, adhered to) the first wall. A second amount of foam material is poured into another mold configured to form the other of the walls 162, 164. The free edge of the pleated paper is then inserted into the second amount of foam material, prior to solidification of the second wall. According to an exemplary embodiment, no fasteners are used to form the filter element 160, other than the pleated paper 166 and foam material.

In some embodiments, pleating of the paper 166 provides rigidity to the filter element 160 between the walls 162, 164, holding the walls 162, 164 apart and in place relative to one another. Additionally, the pleating increases the surface area of the paper 166, increasing the area through which air may be filtered. Use of solidified (e.g., hardened, rubbery) foam material for the walls 162, 164 is intended to improve the seal between the apertures 170, 172 of the filter element 160 and the bosses 176, 178, because the apertures 170, 172 may stretch around and hold tightly to the outer walls of the bosses 176, 178. In other contemplated embodiments, only the bottom wall 164 is formed from foam material.

The construction and arrangements of the air filter assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter element for an air filter assembly of an internal combustion engine including a breather conduit and an intake conduit, comprising:
    a first wall;
    a second wall;
    filter media extending between the first and second walls;
    a first aperture in one of the first and second walls configured to receive air from the breather conduit; and
    a second aperture in one of the first and second walls configured to deliver air to the intake conduit;
    wherein the filter media, the first wall, and the second wall define an interior chamber of the filter element, and wherein the first and second apertures connect to the interior chamber such that air filtered by the filter media mixes with unfiltered gases provided through the first aperture by the breather conduit prior to exiting the interior chamber through the second aperture into the intake conduit
    wherein the first and second apertures are equally spaced apart from a center of the filter element.

2. The filter element of claim 1, wherein the first and second apertures are equally sized.

3. The filter element of claim 2, wherein the first and second apertures are the same shape.

4. The filter element of claim 3, wherein the first and second apertures are both defined in the first wall.

5. The filter element of claim 4, wherein the first and second apertures are symmetrically arranged with respect to one another about a first line defined along the second wall.

6. The filter element of claim 5, wherein the first and second apertures are symmetrically arranged with respect to themselves about a second line defined along the second wall.

7. The filter element of claim 6, wherein the filter media comprises pleated paper.

8. The filter element of claim 7, further comprising:
    a groove surrounding the first and second apertures on an exterior of the second wall.

9. A filter element for an air filter assembly of an engine including a breather conduit and an intake conduit, comprising:
- filter media having a closed loop, the filter media having a top and bottom;
- a first wall provided on the top of the filter media, the first wall having no openings; and
- a second wall provided on the bottom of the filter media, the second wall having two separate openings;
- wherein the filter media, the first wall, and the second wall define an interior chamber of the filter element, and wherein the two openings connect to the interior chamber such that air filtered by the filter media mixes with unfiltered gases provided through a first of the two openings by the breather conduit prior to exiting the interior chamber through a second of the two openings into the intake conduit.

10. The filter element of claim 9, wherein the second wall comprises a foam material.

11. The filter element of claim 10, wherein the filter media comprises pleated paper.

12. The filter element of claim 11, wherein the openings of the second wall are round.

13. The filter element of claim 11, wherein the openings of the second wall are equally spaced from a center point of the second wall.

14. The filter element of claim 11, wherein the openings of the second wall are equally sized.

15. The filter element of claim 11, wherein the first and second walls have peripheries of the same shape.

16. The filter element of claim 15, wherein the peripheries of the first and second walls include straight segments extending between rounded ends.

17. The filter element of claim 11, wherein the foam material comprises urethane foam.

18. The filter element of claim 17, wherein the first wall comprises urethane foam.

19. The filter element of claim 11, wherein the pleated paper is integrated into portions of the first and second walls.

20. An engine air filter for an engine including a breather conduit and an intake conduit, comprising:
- a first wall,
- a second wall;
- a paper filter element coupled between the first wall and the second wall, the first wall, the second wall, and the paper filter element forming an interior chamber; and
- first and second apertures formed in the second wall;
- wherein the first and second apertures each provide a pathway between the interior chamber and the exterior of the air filter, and wherein the interior chamber permits the mixing of air delivered into the interior chamber via the first aperture and through the paper filter such that air filtered by the filter media mixes with unfiltered gases provided through the first aperture by the breather conduit prior to exiting the interior chamber through the second aperture into the intake conduit.

21. The air filter of claim 20, further comprising a groove formed on an exterior side of the second wall, the groove configured to interface with an opposing structure on an engine air filter assembly.

22. The air filter of claim 21, further comprising a second groove formed on an exterior side of the first wall, the second groove configured to interface with an opposing structure on an engine air filter assembly.

23. The air filter of claim 22, wherein the paper filter is pleated.

* * * * *